(12) United States Patent
Willimowski et al.

(10) Patent No.: US 8,012,643 B1
(45) Date of Patent: Sep. 6, 2011

(54) GAS CONTROL AND OPERATION METHOD OF A FUEL CELL SYSTEM FOR WATER AND GAS DISTRIBUTION

(75) Inventors: Peter Willimowski, Robdorf (DE); Robert Schafer, Darmstadt (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/092,231

(22) Filed: Apr. 22, 2011

Related U.S. Application Data

(62) Division of application No. 12/327,195, filed on Dec. 3, 2008, which is a division of application No. 10/612,380, filed on Jul. 2, 2003, now Pat. No. 7,479,336.

(51) Int. Cl.
*H01M 2/40* (2006.01)
*H01M 8/04* (2006.01)

(52) U.S. Cl. ........ 429/455; 429/454; 429/428; 429/447; 429/443; 429/513; 429/512

(58) Field of Classification Search .......... 429/447, 429/443, 428, 454, 455
See application file for complete search history.

(56) References Cited

U.S. PATENT DOCUMENTS

| | | |
|---|---|---|
| 4,243,731 A | 1/1981 | Cheron |
| 5,935,726 A | 8/1999 | Chow et al. |
| 6,911,277 B2 | 6/2005 | Skala et al. |
| 2002/0192517 A1 | 12/2002 | Beckmann et al. |
| 2003/0211374 A1 | 11/2003 | Dehne et al. |
| 2004/0048133 A1 | 3/2004 | Faris et al. |
| 2004/0166383 A1 | 8/2004 | Schafer et al. |

FOREIGN PATENT DOCUMENTS

WO    WO 03/005472    1/2003

*Primary Examiner* — Helen O Conley
(74) *Attorney, Agent, or Firm* — Harness, Dickey & Pierce, P.L.C.

(57) ABSTRACT

A gas control and operation method of a fuel cell system for improved water and gas distribution is disclosed. The present invention provides for a mechanization of a fuel cell system that allows control of the anode reactant and anode effluent through the anode portions of the fuel cell system to improve water and gas distribution on the anode side of the fuel cells that increases the voltage stability of the fuel cells.

5 Claims, 3 Drawing Sheets

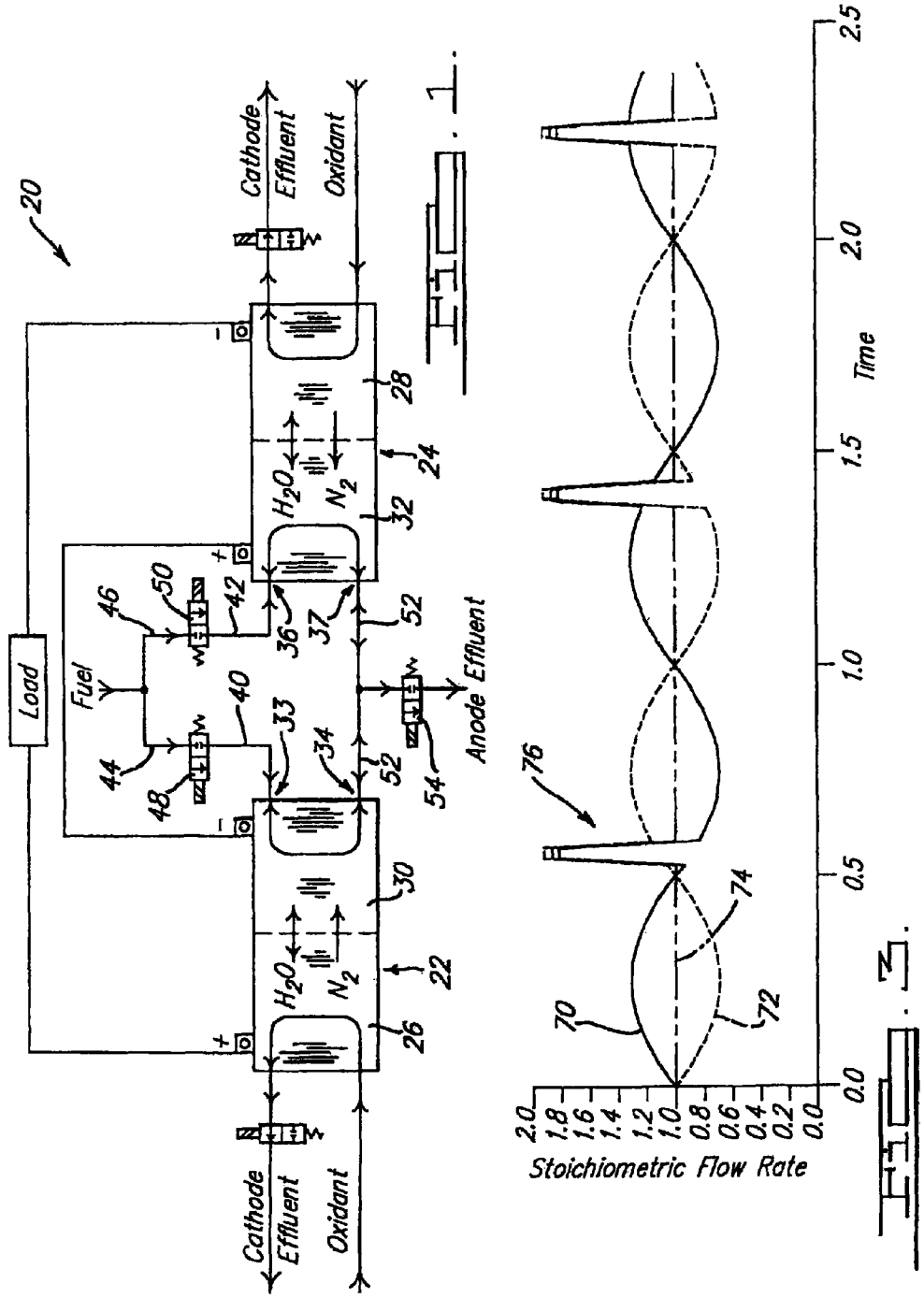

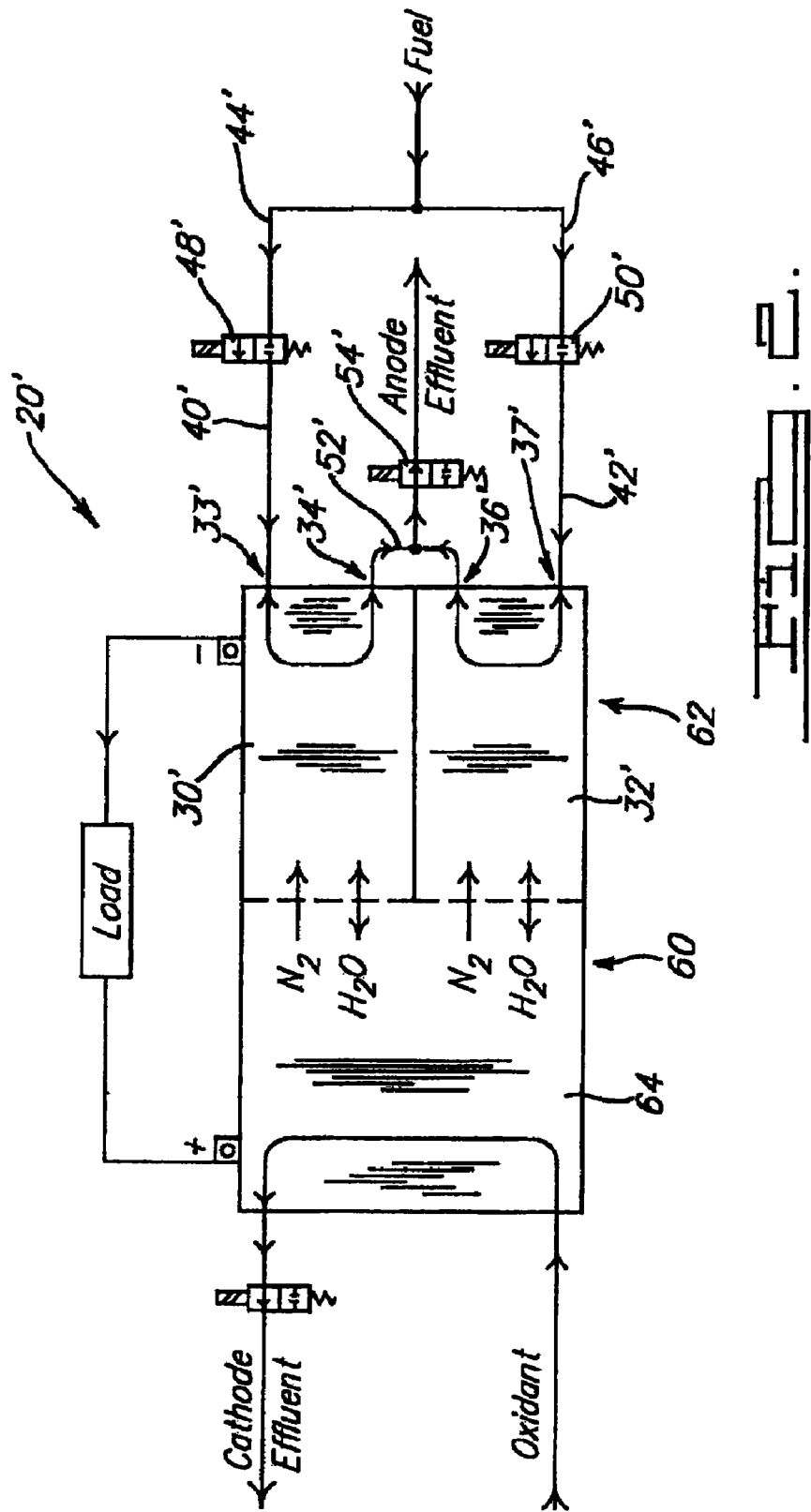

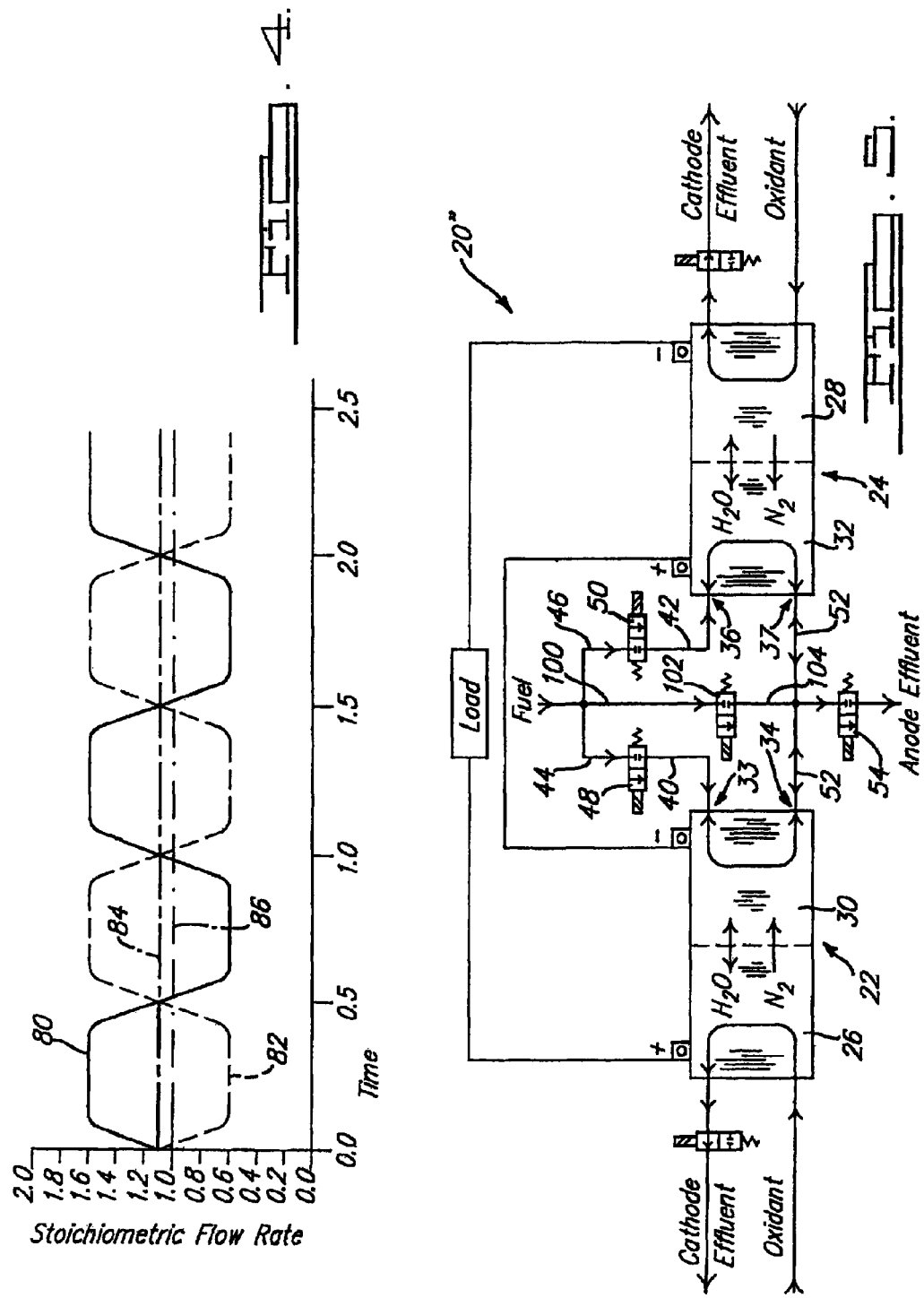

GAS CONTROL AND OPERATION METHOD OF A FUEL CELL SYSTEM FOR WATER AND GAS DISTRIBUTION

CROSS-REFERENCE TO RELATED APPLICATION

This application is a divisional of U.S. patent application Ser. No. 12/327,195 filed on Dec. 3, 2008 which is a divisional of U.S. patent application Ser. No. 10/612,380 filed on Jul. 2, 2003. The disclosures of the above applications are incorporated herein by reference.

FIELD OF THE INVENTION

The present invention relates generally to fuel cell systems and more particularly to gas control and operation method of a fuel cell system for improved water and gas distribution.

BACKGROUND OF THE INVENTION $H_2$—$O_2$(air) fuel cells are well known in the art and have been proposed as a power source for many applications. There are several types of $H_2$—$O_2$ fuel cells including acid-type, alkaline-type, molten-carbonate-type, and solid-oxide-type. So called PEM (proton exchange membrane) fuel cells (a.k.a. SPE (solid polymer electrolyte) fuel cells) are of the acid-type, potentially have high power and low weight, and accordingly are desirable for mobile applications (e.g., electric vehicles). PEM fuel cells are well known in the art, and include a "membrane electrode assembly" (a.k.a. MEA) comprising a thin, proton transmissive, solid polymer membrane-electrolyte having an anode on one of its faces and a cathode on the opposite face. The MEA is sandwiched between a pair of electrically conductive elements which (1) serve as current collectors for the anode and cathode, and (2) contain appropriate channels and/or openings therein for distributing the fuel cell's gaseous reactants over the surfaces of the respective anode and cathode catalysts. A plurality of individual cells are commonly bundled together to form a PEM fuel cell stack.

In PEM fuel cells hydrogen is the anode reactant (i.e., fuel) and oxygen is the cathode reactant (i.e., oxidant). Accordingly, the anode side of the fuel cell stack is supplied with hydrogen or a gas containing hydrogen and the cathode side is supplied with air. During the conversion of the anode reactant and cathode reactant to electrical energy, the fuel cell produces anode and cathode effluents. The anode side is typically operated in a "dead head" mode wherein the anode effluent is not continuously exhausted from the fuel cell stack. With this type of operation, nitrogen accumulates in the anode side of the fuel cells as a result of the diffusion through the MEA. Additionally, water also accumulates in the anode side. The accumulation of water and nitrogen results in a reduction in the operational level of the fuel cells and the voltage stability of the individual fuel cells of the fuel cell stack. This accumulation is typically concentrated in localized portions of the anode side of the fuel cells and, as a result, can cause the reduction in the operational level and the voltage stability of the fuel cells to occur quickly. This localized accumulation causes the reduction in the operational level and the voltage stability of the fuel cell before the remaining portion of the fuel cell is affected.

In order to reduce the nitrogen and water accumulations in the anode side, the anode side is flushed with anode reactant while the anode effluent is being vented from the anode side. However, the flushing of the anode side with the anode reactant leads to an anode effluent that contains a large quantity of hydrogen and therethrough leads to a higher hydrogen consumption. Thus, there is a need to address the accumulation situation.

SUMMARY OF THE INVENTION

The present invention provides a gas control and operation method of the fuel cell system that addresses the accumulation situation, stated above. Specifically, the present invention provides for a mechanization of a fuel cell system that allows control of the anode reactant and anode effluent through the anode portions of the fuel cell system to improve water and gas distribution on the anode side of the fuel cells that increases the voltage stability of the fuel cells and may result in a reduction of the quantity or frequency of a purging operation.

A fuel cell system according to the principles of the present invention includes at least one cathode section having an inlet and an outlet. There are at least two anode sections each having an inlet and outlet. The at least one cathode section and the at least two anode sections are operable to convert an oxidant-containing cathode reactant in the at least one cathode section and a hydrogen-containing anode reactant in the at least two anode sections into electricity, an oxidant-containing cathode effluent and a hydrogen-containing anode effluent. A first flow path is operable to supply a first hydrogen-containing anode reactant feed stream to an inlet of a first anode section of the at least two anode sections. A second flow path is operable to supply a second hydrogen-containing anode reactant feed stream to an inlet of a second anode section of the at least two anode sections. A first valve in the first flow path is operable to modulate flow through the first flow path while a second valve in the second flow path is operable to modulate flow through the second flow path. There is a third flow path connecting an outlet of the first anode section to an outlet of the second anode section so that the anode effluent from one of the anode sections can flow into an anode outlet of the other anode section. A third valve communicates with the third flow path and is operable to modulate venting of anode effluent from the third flow path.

A method of operating a fuel cell system having at least one cathode section and at least two anode sections which are operable to convert an oxidant-containing cathode reactant and a hydrogen-containing anode reactant into electricity, a cathode effluent and an anode effluent is disclosed. The method includes: (1) supplying a first anode reactant feed stream to a first anode section of the at least two anode sections; (2) supplying a second anode reactant feed stream to a second anode section of the at least two anode sections; (3) supplying an anode effluent from one of the first and second anode sections to the other of the first and second anode sections; and (4) adjusting a quantity of at least one of the first and second anode reactant feed streams being supplied, so that alternatively, the one and then the other of the first and second anode sections receives anode effluent.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a simplified schematic representation of a preferred embodiment of a fuel cell system according to the principles of the present invention;

FIG. 2 is a simplified schematic representation of a first alternate fuel cell system according to the principles of the present invention;

FIG. 3 is a graphical representation of a gas flow pattern for a fuel cell system according to the principles of the present invention operated with intermediate burping of the anode effluent;

FIG. 4 is a graphical representation of a gas flow pattern for a fuel cell system according to the principles of the present invention with continuous venting of anode effluent; and FIG. 5 is a simplified schematic representation of a second alternate fuel cell system according to the principles of the present invention.

DETAILED DESCRIPTION OF THE PREFERRED EMBODIMENT

The following description of the preferred embodiment is merely exemplary in nature and is in no way intended to limit the invention, its application, or uses.

Referring to FIG. 1, a preferred embodiment of a fuel cell system 20 according to the principles of the present invention is shown. Fuel cell system 20 and its method of operation, as described below, provides for improved water and nitrogen distribution throughout the anode sections of the fuel cell system and avoids the disadvantages stated above. Fuel cell system 20 includes first and second fuel cell stacks 22 and 24 that each have a respective cathode side or portion 26 and 28 that each receive an oxidant-containing cathode reactant flow. First and second fuel cell stacks 22 and 24 also each have a respective anode side or portion 30 and 32 that receive a hydrogen-containing anode reactant flow or fuel. Specifically, first anode side 30 of first fuel cell stack 22 has an inlet portion 33 for receiving anode reactant flow and an outlet portion 34 for discharging anode effluent produced therein. Likewise, second anode side 32 of second fuel stack 24 has an inlet portion 36 for receiving the anode reactant flow and an outlet portion 37 for discharging anode effluent produced therein. Each fuel cell stack 22 and 24 is operable to convert the anode and cathode reactants into electricity, a hydrogen-containing anode effluent, and an oxygen-containing cathode effluent.

The hydrogen-containing anode reactant or fuel can be provided from a variety of sources. Such sources include, but are not limited to, a reformate stream from a reformer and hydrogen from a hydrogen storage device. The cathode reactant can also be provided from a variety of sources. Such sources include, but are not limited to, oxygen supplied from an oxygen storage device and air drawn from the environment within which fuel cell system 20 is employed. The cathode reactant supply to the fuel cell stacks and the venting of cathode effluent produced in the fuel cell stacks will not be discussed in detail. It should be understood that cathode reactant will be supplied to the various fuel cell stacks in a quantity sufficient to meet the operational demands of fuel cell system 20 and that cathode effluent will be removed from fuel cell system 20 as needed.

The anode reactant is supplied to fuel system 20 in a quantity sufficient to meet the operational demands of fuel cell system 20. The anode reactant can be supplied to fuel system 20 in a variety of ways. For example, a gas injector (not shown) capable of metering a flow therethrough can be utilized to inject anode reactant into fuel cell system 20. The anode reactant supplied to fuel cell system 20 is divided into first and second anode reactant streams 40 and 42 that flow to the respective anode inlet portions 33 and 36 of first and second fuel cell stacks 22 and 24 via first and second flow paths 44 and 46. First and second valves 48 and 50 are located in the respective first and second flow paths 44 and 46. Valves 48 and 50 modulate the first and second anode reactant streams 40 and 42 and, accordingly, control the division of the anode reactant supplied to fuel cell system 20. Specifically, valves 48 and 50 regulate the quantity of anode reactant flowing through first and second flow paths 44 and 46 and, thus, the amount of anode reactant flowing to anode sides 30 and 32 of first and second fuel cell stacks 22 and 24. Valves 48 and 50 can divide the anode reactant flowing to fuel cell system 20 between flowing entirely to first fuel cell stack 22 via first flow path 44 to flowing entirely to second fuel cell stack 24 via second flow path 46 or a combination therebetween.

A third flow path 52 interconnects outlet portions 34 and 37 of the respective first and second anode sides 30 and 32. The interconnection of outlet portions 34 and 37 enable anode effluent produced in one of the fuel cell stacks to flow into the anode side of the other fuel cell stack through the outlet on the other fuel cell stack, as described below. A third valve 54 communicates with third flow path 52 and is operable to modulate the venting of anode effluent from fuel cell system 20. That is, third valve 54 is used to selectively vent anode effluent from fuel cell system 20, as described below. The anode effluent vented from fuel cell system 20 via valve 54, depending upon the hydrogen content, is either released to the atmosphere or sent to a downstream component (not shown). Valve 54 can be a simple open and closed valve or a proportional valve that is operable to regulate the quantity of anode effluent flowing therethrough. The operational requirements of third valve 54 will vary depending upon how fuel cell system 20 is to be operated, as described below.

A microprocessor or similar apparatus (not shown) is employed to control the operation of fuel cell system 20. The microprocessor controls operation of valves 48, 50 and 54. The microprocessor controls the individual operation of the valves to operate fuel cell system 20 in a desired mode, as discussed below.

The arrangement of fuel cell system 20, illustrated in FIG. 1, utilizes two separate fuel cell stacks 22 and 24. The gas control and operation method according to the principles of the present invention, however, can also be utilized with a fuel cell system 20', illustrated in FIG. 2, that has a single fuel cell stack 60 having an anode side or portion 62 that is partitioned or divided into two discreet anode sections 30' and 32' that each receive an anode reactant stream, as described below. Single fuel cell stack 60 also has a cathode side or portion 64 that receives a cathode reactant stream, in the same manner as that disclosed above for first and second fuel cell stacks 22 and 24. Accordingly, the cathode side 64 and the supplying of cathode reactant and removal of cathode effluent will not be described further.

First anode section 30' has respective inlet and outlet portions 33' and 34'. Similarly, second anode section 32' also has respective inlet and outlet portions 36' and 37'. The anode reactant supplied to fuel cell system 20' is divided between first and second anode sections 30' and 32' as discussed above with reference to first cell system 20. That is, the fuel cell system 20' also has first and second flow paths 44' and 46' with respective valves 48' and 50' that are operable to divide anode reactant flowing to fuel cell system 20' into first and second anode reactant streams 40' and 42'. The outlet portions 34' and 36' of respective first and second anode sections 30' and 32' are interconnected by a third flow path 52'. A third valve 54' communicates with third flow path 52' to selectively vent anode effluent from fuel cell system 20'. Thus, the anode portions and the configuration to supply anode reactant to the anode portions in fuel cell system 20' is substantially the same as that of fuel cell system 20. Due to this similarity, only the operation of the anode portions of fuel cell system 20 will be described in detail. It should be appreciated, however, that the operation of the anode portions of fuel cell system 20' are substantially identical to that of fuel system 20.

Fuel cell system 20 is operated to meet a known power load or demand placed on fuel system 20. That is, a load or power requirement is placed on fuel cell system 20 and fuel cell system 20 is operated in a manner appropriate to meet this load or demand. To meet the load placed on fuel cell system 20, the cathode reactant is provided to the cathode sides 26 and 28 of first and second fuel cell stacks 22 and 24 in a quantity sufficient to meet the load. Similarly, anode reactant is supplied to anode portions 30 and 32 of first and second fuel cell stacks 22 and 24 in a quantity sufficient to meet the load placed on fuel cell system 20. The cathode effluent is vented from first and second fuel cell stacks 22 and 24 on an as needed basis with valves in cathode effluent flow paths providing regulation of the venting of cathode effluent and also maintaining a desired pressure within cathode sides 26 and 28 of first and second first fuel cell stacks 22 and 24.

Anode effluent produced in anode sides 30 and 32 of first and second fuel cell stacks 22 and 24 flows out of first and second fuel cell stacks 22 and 24 via the respective outlet portions 34 and 37. The anode effluent can be either vented from fuel cell system 20 via valve 54 or flow into the anode side of the other fuel cell stack depending upon the operation of fuel cell system 20 and the flow rates of first and second anode reactant streams 40 and 42, as discussed below. Venting of anode effluent from fuel cell system 20 can be performed in a variety of manners. For example, the venting of anode effluent can be through a burping operation, a discontinuous venting operation or a continuous venting operation, as described below. Preferably, anode effluent is vented from fuel cell system 20 in what is known as a burping operation or mode. The burping operation is characterized in that valve 54 is normally closed and anode effluent is not being vented from fuel cell system 20 and a various times anode effluent is vented from fuel cell system 20 via valve 54 at a large rate for a short duration of time. The burping operation also consists of increasing the supply of anode reactant flowing to first and/or second fuel cell stacks 22 and 24 which provides a large flow rate to purge nitrogen and water accumulated in the anode sides 30 and/or 32 of first and/or second fuel cell stacks 22 and 24.

Alternately, as stated above, anode effluent can be vented from fuel cell system 20 in a discontinuous manner. The discontinuous venting of anode effluent is characterized by normally maintaining valve 54 closed with anode effluent not being vented and at various times opening valve 54 and venting anode effluent from fuel cell system 20 at a lower rate for a longer duration of time relative to the burping operation. The discontinuous venting operation usually will require a slight increase in the flow rate of anode reactant to the first and/or second fuel cell stacks 22 and 24 through valves 48 and 50 in order to keep the anode pressure substantially constant. This increase is negligible in that it does not result in a significant differential pressure across the stacks 22 and 24 or a higher turndown requirement for valves 48 and 50. It should be appreciated, that the lower rate of venting that occurs for a longer duration of time can provide an equivalent purging operation of anode sides 30 and 32 of first and second fuel cell stacks 22 and 24 to remove nitrogen and water accumulated therein. Also alternatively, as stated above, anode effluent can be vented from fuel cell system 20 in a continuous manner. A continuous venting of anode effluent is characterized by valve 54 being controlled to allow a continuous flow of anode effluent to be vented from fuel cell system 20. These various methods of venting anode effluent from fuel cell system 20 are described below in more detail with reference to operation of fuel cell system 20.

In the preferred operation of fuel cell system 20, anode reactant is supplied to fuel cell system 20 in a quantity sufficient to meet a load or demand placed on fuel cell system 20 and anode effluent is vented in a burping operation. The anode reactant is split into first and second anode reactant streams 40 and 42 that flow through respective first and second flow paths 44 and 46. The partitioning of the anode reactant into first and second anode reactant steams 40 and 42 is performed by first and second valves 48 and 50. Specifically, valves 48 and 50 are operated to regulate the quantity of anode reactant flowing through first and second flow paths 44 and 46. First anode reactant stream 44 flows into anode side 30 of first fuel cell stack 22 through inlet portion 33 wherein the anode reactant is used to produce electrical power. Similarly, the second anode reactant stream 42 flows into anode side 32 of second fuel cell stack 24 through inlet portion 36 wherein the anode reactant is used to produce electrical energy. At various intervals, valve 54 is opened and fuel cell system 20 is burped. When being burped, first and second anode reactant streams 40 and 42 exit the respective anode sides 30 and 32 through outlet portions 34 and 37 as anode effluent and are vented from fuel cell system 20 through third flow path 52 and third valve 54. During the burping operation, valves 48 and/or 50 are operated to increase the flow of anode reactant flowing to first and/or second fuel cell stacks 22 and 24 to cause a large amount of anode effluent to vent from fuel cell system 20 in a short duration of time and facilitate the removal of nitrogen and water from anode sides of first and/or second fuel cell stacks 22 and 24, as described below.

Anode effluent from first and second fuel cell stacks 22 and 24, however, is usually not being vented from fuel cell system 20 as third value 54 is usually closed and only opens during a burping operation. In other words, valve 54 is only open at certain times during the operation of fuel cell system 20 and is closed during the other times. With third valve 54 closed, anode effluent from first and second fuel cell stacks 22 and 24 may or may not flow into third flow path 52. Rather, depending upon the partitioning of the anode reactant flowing to first and second fuel cell stacks 22 and 24, anode effluent produced in one of the fuel cell stacks may flow into the anode side of the other fuel cell stack through its outlet portion. That is, when first anode reactant stream 40 is being introduced into first fuel cell stack 22 at a faster rate than second anode reactant stream 42 is being introduced into second fuel cell stack 24, the first anode reactant stream 40 will continue flowing through anode side 30 of first fuel cell stack 22 and exit via outlet portion 33 into third flow path 52 as anode effluent. The anode effluent will continue traveling through third flow path 52 until it encounters or meets second anode reactant stream 42 and/or anode effluent flowing out from second fuel cell stack 24 via outlet portion 37.

The location at which the two streams meet in fuel cell system 20 is considered a "dead spot" wherein flow through that location of fuel cell system 20 is essentially stagnant and a pressure balance of the two flows occurs. The location of the stagnant or dead spot will vary depending upon the rate at which first and second anode reactant streams 40 and 42 are introduced into fuel cell system 20 and can be moved by unbalancing the flows. For example, the dead spot can occur in the anode side 32 of second fuel cell stack 24 when first anode reactant stream 40 is being supplied at a faster rate than the second anode reactant stream 42. In this case, anode effluent exiting the first fuel cell stack 22 via outlet portion 34 will flow through the third flow path 52 and into anode side 32 of second fuel cell stack 24 through outlet portion 37 on second fuel cell stack 24. Thus, the dead spot where the two flows meet occurs in the anode side 32 of second fuel cell stack 24. Similarly, the dead spot can occur in anode side 30 of first fuel cell stack 22 when second anode reactant stream 42 is flowing into second fuel cell stack 24 at a faster rate than first anode reactant stream 40 is flowing into first fuel cell stack 22. In this situation, anode effluent from second fuel cell stack 24 flows through outlet portion 37, third flow path 52 and into anode side 30 of first fuel cell stack 22 via outlet portion 34 on first fuel cell stack 22. In an extreme case, either first or second valve 48 or 50 is closed while all the anode reactant is supplied to fuel cell system 20 via the open valve. In this situation, the anode reactant will flow through the first fuel cell stack that it encounters, exit that fuel cell stack as anode effluent and flow through the other fuel cell stack in a reverse fashion entering through the outlet and exiting through the inlet of that fuel cell stack until it encounters the closed valve. Thus, by controlling the rate at which first and second anode reactant streams 40 and 42 are allowed to enter fuel cell system 20, the location of the dead spot or stagnation of the anode reactant flows can be adjusted to occur at various locations throughout the anode flow paths of fuel cell system 20. Accordingly, it should be appreciated that the location of the dead spot can vary from being at an outlet of one of the valves 48 and 50 or anywhere in between.

The ability to move the dead spot or point of stagnation of anode reactant throughout the anode flow paths of fuel cell system 20 allows for improved water and gas distribution throughout the anode portion. That is, the stagnation point is the location at which a significant amount of the nitrogen in the flow paths will accumulate. The ability to dynamically move the location of the dead spot or point of stagnation throughout the anode flow paths of fuel cell systems 20 causes the nitrogen and water in the anode flow paths to also move throughout the anode flow paths and be more evenly distributed along the membranes separating the anode and cathode sides. The distributing of the nitrogen more evenly along the surface of the membranes separating the anode and cathode sides increases the duration for which fuel cell system 20 can be operated without venting anode effluent. That is, the more even distribution of nitrogen along the surface of the membranes allows the performance of all the fuel cells comprising the fuel cell stacks to be increased and the performance of all the fuel cells will decrease at a slower and similar rate before decreasing to a point at which the nitrogen must be removed from the anode sides of fuel cell system 20. By increasing the intervals between venting of anode effluent, more of the hydrogen within the anode reactant streams 40 and 42 can be consumed to produce electrical energy before being vented from fuel cell system 20 as part of the anode effluent.

To achieve this better distribution, fuel system 20 is operated with the quantity of anode reactant supplied via first and second anode reactant streams 40 and 42 dynamically varying relative to one another to move the dead spot to different locations within the anode sides and flow paths of fuel cell system 20. As the dead spot is moved about, the nitrogen and water in the anode sides and flow paths of fuel cell system 20 will be more evenly distributed between first and second fuel stacks 22 and 24. The adjusting or varying of the quantity of anode reactant supplied via first and second anode reactant streams 40 and 42 can be based upon a variety of control scenarios. One control scenario is based on comparing the current operating condition of fuel cell system 20, such as load on the system, voltage stability of the fuel cells and/or fuel cell stacks, pressure, etc., to empirical data and based on that comparison adjusting the quantity of anode reactant supplied to first and second anode reactant streams 40 and 42. The empirical data is established by operating fuel cell system 20 or an equivalent thereof on a test setup wherein the load on the fuel cell system is changed while other operating parameters of the system are monitored, such as the nitrogen level, the nitrogen distribution, water level and water distribution, and cell voltages. The load on the fuel cell system is kept constant while the quantity of anode reactant supplied by the first and second anode reactant streams 40 and 42 is varied. Based on these observations optimal adjusting quantities or times for adjusting the quantities are established that provide desirable operation of the fuel cell system, such as a substantially homogeneous distribution of nitrogen and/or water throughout fuel cell system 20, increased voltage stability and a reduction in the amount of excess hydrogen vented from fuel cell system 20. The load on the fuel cell system is then adjusted and the rates and/or intervals at which the quantity of anode reactant supplied to fuel system 20 via first and second anode reactant streams 40 and 42 is again varied to obtain optimal adjusting quantities and/or times for adjusting the quantities. The optimization can be based on a variety of factors, such as obtaining a desired nitrogen distribution, water distribution, and/or cell voltage output. However, it should be understood that other operating parameters can be monitored and optimized in developing the empirical data and the associated adjusting quantities and/or time for adjusting the quantities.

A second control scenario on which operation of fuel cell system 20 can be operated involves using an algorithm that determines the adjusting quantities and/or time for adjusting the quantities and then operating a fuel cell system 20 based on the algorithm. The algorithm determines the rate at which the quantities being supplied should vary and/or the time at which the rates should be varied based on the load on fuel system 20 or some other parameter, such as cell voltage. The algorithm chosen is based upon providing a desired operation of fuel cell system 20, such as a desired nitrogen distribution, water distribution, and/or cell voltage output.

In a third control scenario, the anode reactant supplied via first and second anode reactant streams 40 and 42 is varied based upon predetermined intervals and rates of changes. For example, as shown in FIG. 3, the quantity of anode reactant in first and second anode reactants 40 and 42 can be sinusoidal. That is, the quantity and/or flow rate of anode reactant in first anode reactant stream 40 can vary sinusoidally, as represented by curve 70. Likewise, the quantity and/or flow rate of anode reactant in second anode reactant stream 42 can also vary sinusoidally, as represented by curve 72. Curves 70 and 72 are shown as being 180° out of phase such that an average quantity or flow rate of anode reactant within fuel cell system 20 remains substantially constant as represented by curve 74. Curve 74 is substantially horizontal and indicates that the average quantity of anode reactant in fuel cell system 20 is about a stoichiometric flow rate of 1.0. The sinusoidal variations of the quantity of anode reactant in first and second anode reactant streams 40 and 42 causes the dead spot within fuel cell system 20 to move and distributes the nitrogen and water more evenly throughout fuel cell system 20. It should be appreciated that the frequency of the sinusoidal curve(s) can be varied to achieve a desired flow pattern and the variation can be based upon empirical data such as that discussed above in relation to the first control scenario.

Anode effluent in fuel cell system 20, as stated above, is vented from fuel cell system 20 in a burping operation. The burping operation involves opening the valve 54 so that a large quantity of anode effluent is vented from fuel cell system 20 over a short interval or duration of time. Simultaneously, the quantity of anode reactant supplied to fuel cell system 20 via first and/or second anode reactant streams 40 and 42 is substantially increased to force or purge the anode effluent along with the water and nitrogen from the anode flow path of fuel cell system 20. The quantity of anode effluent vented from fuel cell system 20 determines the amount of nitrogen and/or water that is purged from the fuel cell system. In other words, it is not necessary to purge the entire amount of water and/or nitrogen from fuel cell system 20 during each burping interval. The exact quantity of water and/or nitrogen purged from fuel cell system 20 during the burping operation will vary depending upon the desired operation of fuel cell system 20.

The burping operation of fuel cell system 20 is illustrated in FIG. 3 wherein curves 70, 72, and 74 experience spikes generally indicated as 76. The spikes are indicative of the increased quantity of anode reactant supplied to fuel cell system 20 via first and second anode reactant streams 40 and 42 during the purging operation and the associated increase in the average of these two flows. The period or time interval between burping operations can vary, as discussed below. Additionally, the interval of the burping operations does not need to be in sync with the adjusting of the anode reactant flows. That is, as shown in FIG. 3, the burping operations are out of sync with the sinusoidal switching of the quantities of anode reactant supplied via first and second anode reactant streams 40 and 42. It should be appreciated, however, that the burping operation can be in sync with the switching of the reactant flows, if desired.

The burping of anode effluent from fuel cell system 20 can be controlled such that only one fuel cell stack in fuel cell system 20 is purged during a given venting operation. That is, during the venting operation, only one of the valves 48 and 50 is adjusted to provide a surge of anode reactant to the associated downstream fuel cell stack while the other valve allows a lower flow rate of anode reactant to the other fuel cell stack. The surge of anode reactant will flow through the associated downstream fuel cell stack and exit the fuel cell stack as anode effluent that is then vented through valve 54. This surge of anode reactant helps purge the fuel cell stack through which it flows of water and nitrogen. The other fuel cell stack receives anode reactant at a rate sufficient to prevent the surge of anode reactant flowing through the fuel cell system from entering that fuel cell stack in a reverse fashion. It should be appreciated, however, that a portion of the surge of anode reactant may flow in a reverse fashion through the other fuel cell stack without departing from the scope of the present invention. The other fuel cell stack can then be purged through a subsequent venting operation by supplying a surge of anode reactant to that fuel cell stack while maintaining the other fuel cell stack with a flow rate sufficient to prevent or minimize the flow of anode fluid in a reverse fashion through the other fuel cell stack. If desired, both fuel cell stacks can be purged simultaneously by increasing the flow of anode reactant to both of the fuel cell stacks while valve 54 is open. Thus, during a venting operation of fuel cell system 20, a single fuel cell stack can be purged of water and nitrogen or both fuel cell stacks can be purged of water and nitrogen, as desired.

The interval between burping operations may vary and can be based upon a variety of control scenarios. Once control scenario can be based upon comparing the current operating condition of fuel cell system 20 to empirical data and based on that comparison adjusting the time interval between burping operations. The empirical data can be established in conjunction with the method described above with obtaining empirical data for the adjusting of the quantities and time between adjustments of the quantities of anode reactant flowing to the fuel cell stacks.

A second scenario for the burping of fuel cell system 20 is using an algorithm that determines burping times and then burping fuel cell system 20 based on the algorithm. The algorithm chosen is based upon providing a desired operation of fuel cell system 20, such as a desired nitrogen distribution, water distribution, and/or voltage output.

In a third control scenario, the time at which fuel cell system 20 is burped is based upon a specific or multiple operating parameters of fuel cell system 20. That is, one or more operating parameters of fuel cell system 20, such as nitrogen level, water level, and cell voltage stability, is monitored and when a threshold for one or more of these parameters is reached, anode effluent is vented from fuel cell system 20 in a burping operation. If desired, the parameters monitored can be specific to an individual fuel cell stack such that when the monitored parameter for that fuel cell stack passes a predetermined threshold, that fuel cell stack is purged in a burping operation of fuel cell system 20 while the other fuel cell stack is not purged, as discussed above. Thus, this control scenario facilitates the monitoring of operating parameters of the individual fuel cell stacks and the purging of nitrogen and water from a specific fuel cell stack on an as needed basis or interval.

Accordingly, fuel cell system 20 is preferably operated in a burping mode with the quantities of anode reactant supplied to first and second fuel cell stacks 22 and 24 via first and second anode reactant streams 40 and 42 being varied so that a desired operation of fuel cell system 20 is obtained. The fuel cell system 20 can be operated in this manner to provide a desired nitrogen distribution, water distribution, and/or voltage stability of fuel cell system 20.

Fuel cell system 20 can be operated in a first alternate operating mode wherein anode effluent is vented in a discontinuous manner which is different from that of the burping operation described above. That is, as stated above, the burping operation is distinguished from the discontinuous operation by the rate and duration of the venting operation. Specifically, the burping operation involves venting a large quantity of anode effluent in a short duration of time while in a discontinuous venting operation anode effluent is vented at a lower or slower rate for a longer duration of time. Additionally, the burping operation is accompanied by a surge in the quantity of anode reactant flowing to the fuel cell stacks while in the discontinuous venting the surge in anode reactant flow is not required. That is, the discontinuous venting operation is not a purging of the anode flow paths of fuel cell system 20 as is done with the burping operation and, accordingly, does not require a surge in the quantity of anode reactant being supplied to fuel cell system 20 and, as stated above, will require at most a slight increase in anode reactant flow in order to keep the anode pressure substantially constant. When operating fuel cell system 20 with discontinuous venting of anode effluent, valve 54 is opened at various time intervals and for various durations to allow venting of anode effluent from fuel cell system 20.

The interval between the discontinuous venting of anode effluent and the duration of the venting occurrence can vary and can be based upon a variety of control scenarios. For example, the interval between discontinuous venting occurrences and duration can be based upon comparing the current operating condition of fuel cell system 20 to empirical data, based on an algorithm, or based on specific operating parameters of fuel cell system 20, such as voltage stability of one or more fuel cells and/or stacks, in the same manner as that stated above with reference to burping fuel cell system 20. The discontinuous venting of anode effluent from fuel cell system 20 is done in conjunction with the varying of the quantities of anode reactant supplied to the fuel cell stacks in first and second anode reactant streams 40 and 42 to provide a desired operation of fuel cell system 20, such as a desired water distribution, nitrogen distribution and/or voltage stability.

The discontinuous venting of anode effluent allows the flow of anode effluent from one of the fuel cell stacks to enter the anode side of the other fuel cell stack via its outlet, even during the venting of anode effluent. This is achieved by providing anode reactant to one of the fuel cell stacks at a greater rate than to the other fuel cell stack and at a greater rate than is being vented from fuel cell system 20. This causes a portion of anode effluent produced by one of the fuel cell stacks to be vented from fuel cell system 20 while the remaining portion of the anode effluent from that fuel cell stack can flow into the anode side of the other fuel cell stack and result in a dead spot in the other fuel cell stack. With this capability, a dead spot can still occur within the anode flow paths during the venting of fuel cell system 20 and that dead spot can be adjusted throughout the anode flow path of fuel cell system 20 by varying the quantities of anode reactant supplied to first and second anode reactant streams 40 and 42 and the quantity of anode effluent being vented from fuel cell system 20 which alters the pressure balance of the flows. Thus, fuel cell system 20 can be operated with a discontinuous venting of anode effluent and result in improved distribution of water, nitrogen and/or voltage stability of fuel cell system 20.

Fuel cell system 20 can also be operated in a second alternate operating mode wherein anode effluent is continuously vented from fuel cell system 20. In this operating mode, valve 54 remains open and a flow of anode effluent is continually being vented from fuel cell system 20. The amount of anode effluent being vented from fuel cell system 20 can vary depending upon the operation of valve 54. For example, valve 54 can provide a very low and continuous rate of venting of anode effluent from fuel cell system 20 or can be opened a further amount to allow an increased flow of anode effluent from fuel cell system 20. During the continuous venting of anode effluent, the quantity of anode reactant supplied to first and second anode reactant streams 40 and 42 will also be varied, as described above, to provide a desired operation of fuel cell system 20. Due to the continuous venting of anode effluent, the total quantity of anode reactant supplied to fuel cell system 20 is higher than that when operated in the burping or discontinuous venting modes. For example, as shown in FIG. 4, the quantity of anode reactant supplied to the first and second anode reactant streams 40 and 42 can be a gradual step change, as represented by curves 80 and 82 respectively. The average stoichiometric flow rate of anode reactant within fuel cell system 20, as indicated in curve 84, is above 1.0 due to the continuous venting of a portion of anode effluent from fuel cell system 20. The stoichiometric rate at which anode reactant is consumed within fuel cell system 20, however, as indicated in curve 86, remains at 1.0 for the ideal operation of fuel cell system 20.

The continuous venting of anode effluent still allows the flow of anode effluent from one of the fuel cell stacks to flow into the anode side of the other fuel cell stack via the outlet portion in a similar manner to that discussed above. This is achieved by providing anode reactant to one of the fuel cell stacks at a greater rate than to the other fuel cell stack and at a greater rate than is being vented from fuel cell system 20. This causes a portion of anode effluent produced by one of the fuel cell stacks to be vented from fuel cell system 20 while the remaining portion of the anode effluent from that fuel cell stack can flow into the anode side of the other fuel cell stack and result in a dead spot in the other fuel cell stack. With this capability, a dead spot can still occur within the anode sides and flow paths during a continuous venting of anode effluent from fuel cell system 20 and that dead spot can be adjusted throughout fuel cell system 20 by varying the quantities of anode reactant supplied to first and second anode reactant streams 40 and 42 and the quantity of anode effluent being vented from fuel cell system 20 which alters the pressure balance of the flows. Thus, fuel cell system 20 can be operated with a continuous venting of anode effluent while improving the distribution of water, distribution of nitrogen and/or the voltage stability of fuel cell system 20. It should be appreciated, that if needed, valve 54 can be opened a larger amount so that a larger quantity of anode effluent can be vented from fuel cell system 20 in a pseudo-purging operation as needed.

A second alternate embodiment of a fuel cell system according to the principles of the present invention is shown and indicated as 20" in FIG. 5. Fuel cell system 20" is substantially the same as fuel cell system 20, shown in FIG. 1, with the addition of a fourth flow path 100 and a valve 102 that are used to provide a third anode reactant stream 104. One end of fourth flow path 100 is connected to first and second flow paths 44 and 46 upstream of first and second valves 48 and 50 while an opposite end of fourth flow path 100 is connected to third flow path 52. Valve 102 is positioned in flow path 100 between the first and second flow paths 44 and 46 and third flow path 52. With this arrangement, anode reactant supplied to fuel cell system 20 can be partitioned between first flow path 44, second flow path 46, and fourth flow path 100 to provide first, second, and third anode reactant streams 40, 42, and 104. The addition of third anode reactant stream 104 to fuel cell system 20" enables control of the concentration of anode reactant flowing into the outlets of the anode sides of first and second fuel cell stacks 22 and 24, as described below.

Fuel cell system 20" is preferably operated with the anode effluent being vented in either a burping or discontinuous manner. The burping or discontinuous manner of venting anode effluent is chosen to prevent third anode reactant stream 104 or a portion thereof from being vented from fuel cell system 20" if operated with a continuous venting of anode effluent. That is, if fuel cell system 20" is operated with continuous venting of anode effluent, at least a portion of the third anode reactant stream 104 would be directly vented and waste the hydrogen contained therein.

As stated above, third anode reactant stream 104 is used to control the concentration of anode reactant flowing into the outlet of one of the fuel cell stacks. The addition of a third anode reactant stream 104 to third flow path 54 enables fuel cell system 20" to be operated in a number of different manners that are not available with fuel cell system 20 and 20'. A first operating mode involves using third anode reactant stream 104 to provide anode reactant to anode sides 30 and 32 of respective first and second fuel cell stacks 22 and 24 through respective outlet portions 34 and 37. In this operating mode, first, second, and fourth valves 48, 50, and 102 are operated to provide first, second, and third anode reactant streams 40, 42, and 104. Third anode reactant stream 104 will follow the path of least resistance (i.e., either into anode side 30 through outlet portion 34, anode side 32 through outlet portion 37, or be vented through third valve 54). First, second, and fourth valves 48, 50, and 102 are operated to provide a quantity of anode reactant in first, second, and third anode reactant streams 40, 42, and 104 that causes dead spots to occur within both anode sides 30 and 32 of first and second fuel cell stacks 22 and 24. Specifically, first anode reactant stream 40 flows into anode side 30 of first fuel cell stack 22 via inlet portion 33 while a portion of third anode reactant stream 104 flows into anode side 30 of fuel cell stack 22 via third flow path 52 and outlet portion 34. Simultaneously, second anode reactant stream 42 flows into anode side 32 of second fuel cell stack 24 through inlet portion 36 while the other portion of third anode reactant stream 104 flows into anode side 32 of second fuel cell stack 24 through third flow path 52 and outlet portion 37. The two portions of third anode reactant stream 104 will flow into the respective anode sides 30 and 32 of first and second fuel stacks 22 and 24 until they encounter first and second anode reactant streams 40 and 42 and a pressure balance of the flows occurs. This results in a dead spot or stagnation point within each anode side 30 and 32 of first and second fuel cell stacks 22 and 24. The quantity of anode reactant supplied in first, second, and third anode reactant streams 40, 42, and 104 can be varied, as discussed above, to alter the pressure balance and move the dead spots around within the anode sides 30 and 32 of the respective fuel cell stacks 22 and 24, to improve the water distribution, nitrogen distribution and/or voltage stability of fuel cell system 20".

Alternately, fuel cell system 20" can be operated in a second mode wherein first, second and third anode reactant streams 40, 42, and 104 are controlled to cause third anode reactant stream 104 to flow entirely into only one of anode sides 30 and 32 of first and second fuel cell stacks 22 and 24. For example, first valve 48 can be operated so that first reactant stream 40 is of a quantity sufficient to flow entirely through anode side 30 of first fuel cell stack 22 and exit anode side 30 as an anode effluent before encountering third anode reactant stream 104 in third flow path 52 thus resulting in a dead spot within third flow path 52. With the dead spot occurring in third flow path 52, third anode reactant stream 104 would flow into anode side 32 of second fuel cell stack 24 through outlet portion 37 and encounter second anode reactant stream 42 therein, thus resulting in a second dead spot occurring within anode side 32 of second fuel cell stack 24. If desired, the rates of first, second and third anode reactant streams 40, 42 and 104 can be adjusted so that the anode effluent exiting anode side 30 of first fuel cell stack 22 flows through third flow path 52 and joins with third anode reactant stream 104 and both the anode effluent and third reactant stream 104 flow into anode side 32 of second fuel cell stack 24 through outlet portion 37 and encounter second anode reactant stream 42 therein. This results in a single dead spot within anode side 32 of second fuel cell stack 24. The first, second and third anode reactant streams 40, 42, and 104 can then be adjusted to alter the pressure balance and move this single dead spot from anode side 32 of second fuel cell stack 24 to anode side 30 of first fuel cell stack 22. These capabilities of fuel cell system 20" enable anode reactant to be supplied to an anode side of a fuel cell stack through both its inlet and outlet. Thus, addition of third reactant stream 104 provides additional capabilities of providing anode reactants to the fuel cell stacks and of adjusting dead spots within the anode flow path of fuel cell system 20" to improve the water distribution, nitrogen distribution and/or voltage stability.

The adjustment of the quantity of anode reactant in first, second, and third anode reactants 40, 42, and 104 can be based upon a variety of control scenarios, as discussed above with reference to fuel cell system 20 and 20'. That is, operation of fuel cell system 20" can be based upon comparing current operating conditions to empirical data, based upon an algorithm, and/or a specific operational parameter of fuel cell system 20". Thus, fuel cell system 20" provides additional modes of operating the fuel cell system according to the principles of the present invention to improve the distribution of water, distribution of nitrogen and/or voltage stability of the fuel cell system.

Anode effluent, as stated above, is preferably vented from fuel cell system 20" in either a burping or discontinuous mode. When the burping or discontinuous venting occurs, it is preferred that fourth valve 102 be closed so that there is no third anode reactant stream 104 flowing into third flow path 52. By closing fourth valve 102, anode reactant is not directly vented from fuel cell system 20". The frequency of venting and the duration of such venting of anode effluent when either in the burping or discontinuous mode, can be based upon the same control scenarios and vary in the same way as discussed above with reference to fuel cell system 20.

While the present invention has been described with reference to specific examples shown in the Figures and identified as fuel cell systems 20, 20' and 20", it should be appreciated that variations can be made in the configuration and operation of the various fuel cell systems without departing from the scope of the present invention. For example, one or more water separators (not shown) can be provided in third flow path 52 to remove water from anode effluent flowing therethrough to prevent the addition of water into one of the anode sides 30 and 32 through their respective outlet portions 34 and 37. Positioning of the separator upstream of valve 54 will allow purging of liquid water without purging gas at the same time. This would be beneficial for hydrogen efficiency in cases when a water purge is needed but a nitrogen purge is not needed. Additionally, the varying of the anode reactant in first, second and third anode reactant streams 40, 42 and 104 can vary from that shown in FIGS. 3 and 4. That is, the variation in these flow rates does not need to be sinusoidal, a gradual step change, or similar functions. Rather, the variations can be based upon different operating scenarios, as discussed above, and can take a form that enables operation of the fuel cell system in a desired operational mode. The variation of the anode reactant streams, however, is preferred to be gradual to avoid large pressure differentials between the anode and cathode sides of the fuel cell stack. Moreover, it should be appreciated that anode effluent can be vented from the fuel cell systems in a hybrid venting operation wherein the venting of anode effluent can be in a burping mode, a discontinuous mode, a continuous mode, or a combination thereof such that the venting of an anode effluent will change as operation of the fuel cell system changes. Furthermore, it should be appreciated that while first, second and fourth valves 48, 50 and 102 are shown as being used to regulate the quantity of anode reactant flowing therethrough, these valves can be replaced by gas injectors or similar devices capable of metering and regulating a quantity of anode reactant flowing therethrough.

The present invention alleviates the localized high concentrations of nitrogen and water in the anode side of the fuel cells. Additionally, it leads to more even distribution of the nitrogen and water on the anode side of the fuel cells to prolong the operation of the fuel cells before requiring a purging operation.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of operating a fuel cell system having at least one cathode section and at least two anode sections which are operable to convert an oxidant-containing cathode reactant and a hydrogen-containing anode reactant into electricity, a cathode effluent and an anode effluent,
  (a) supplying a first anode reactant feed stream to a first anode section of the at least two anode sections through a first flow path that communicates with a first inlet to the first anode section;
  (b) supplying a second anode reactant feed stream to a second anode section of the at least two anode sections through a second flow path that communicates with a second inlet to the second anode section;
  (c) supplying a third anode reactant feed stream to a third flow path that connects first and second outlets of the respective first and second anode sections without passing through an anode section, the third flow path providing flow communication between the first and second anode sections through the first and second outlets; and
  (d) varying a quantity of at least one of the first, second and third anode reactant feed streams being supplied.

2. The method of claim 1, wherein varying a quantity of at least one of the first, second and third anode reactant feed streams includes varying the quantity based on an operating parameter of the fuel cell system.

3. The method of claim 1, wherein varying a quantity of at least one of the first, second and third anode reactant feed streams includes adjusting the quantity so that anode effluent from one of the first and second anode sections flows into the other of said first and second anode sections through the third flow path.

4. The method of claim 1, wherein varying a quantity of at least one of the first, second and third anode reactant feed streams includes varying the quantity so that at least one of the first and second anode sections receives two of the anode reactant streams with one of the two anode reactant streams entering through an associated inlet and the other of the two anode reactant streams entering through an associated outlet.

5. The method of claim 1, wherein varying a quantity of at least one of the first, second and third anode reactant feed streams includes modulating the first anode reactant feed stream flowing through the first flow path with a first device, modulating the second anode reactant feed stream flowing through the second flow path with a second device, and modulating the third anode reactant feed stream flowing into the third flow path with a third device.

* * * * *